Patented Nov. 10, 1931

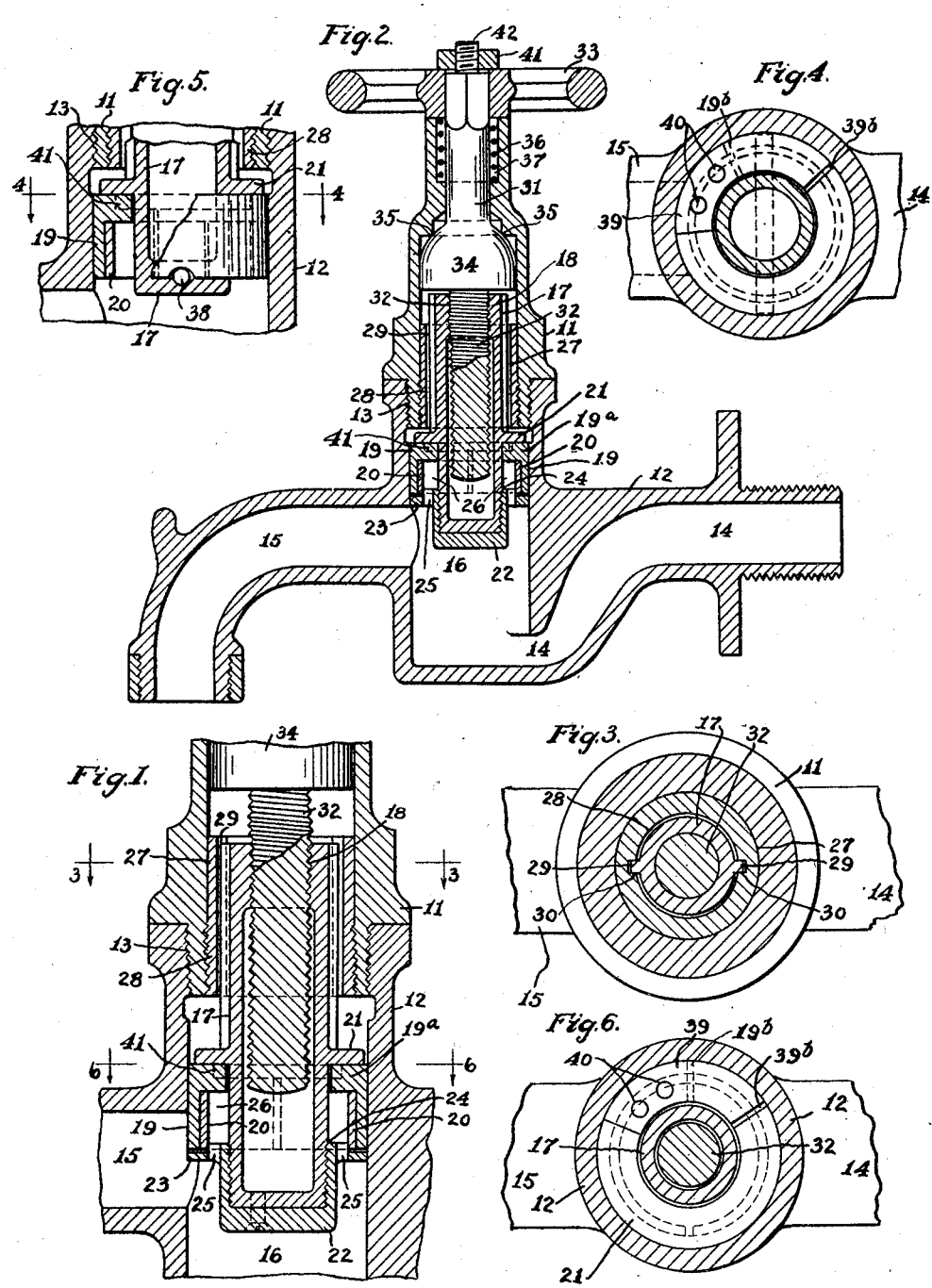

1,831,046

UNITED STATES PATENT OFFICE

BASIL V. SZABÓ, OF BRONXVILLE, NEW YORK

PACKINGLESS AND SEATLESS VALVE FOR FAUCETS

Application filed August 3, 1929, Serial No. 383,280, and in Germany August 5, 1928.

My present invention relates to a faucet of the packingless and seatless type, and has for its object the production of an efficient and simple structure, comparatively inexpensive to manufacture.

One of the advantages of my faucet is that the operating plunger and casing contacting portions are protected against leakage, corrosion and sticking by a fluid-tight metallic self-conforming fluid-pressure expansible ring, and therefore no packing is required where the operating plunger contacts with the casing.

Another advantage in my faucet is that the expansible passage-closing member is constantly under fluid pressure against the walls of the faucet body chamber and therefore automatically self-conforming thereto, thus eliminating regrinding, which is necessary in most valves now in use.

Another advantage in my device is that the amount of force required to turn the stem and move the passage closing means to closing position, is always the same, whereas in most valves of this type where the seats or friction surfaces have become worn and there is no provision for automatically compensating therefor, it is necessary to seat the valve with increasing force as the parts become worn in order to prevent leakage.

Still another advantage of my valve is that even though it remains unused for a long time, the fluid pressure expansible passage closing means also acts as a cleaning member, when the valve is placed in use, for the interior of the casing, and any sediment or corrosion that may have accumulated in the path of said closing means is shaved or scraped off upon the moving of said closing means.

Other objects and advantages of the invention will appear as the description proceeds; and while herein details of the invention are described, the invention is not limited to these, since many and various changes may be made without departing from the scope of the invention as claimed.

In the accompanying drawings, showing by way of example one of the many possible embodiments of the invention, Fig. 1 is an enlarged sectional side elevation showing the position of the interior parts when the valve is in partially closed position.

Fig. 2 is a like view with the valve in full open position and drawn to a smaller scale than Fig. 1.

Fig. 3 is a partial section on the line 3—3 of Fig. 1, looking in the direction of the arrows.

Fig. 4 is a partial section on the line 4—4 of Fig. 5.

Fig. 5 is a sectional side view of the lower part of a modification of my valve.

Fig. 6 is a sectional view on the line 6—6, Fig. 1, looking in the direction of the arrows.

My valve is shown in Figs. 1 and 2 as comprising a housing or casing in two parts, to wit: an upper part 11 and a lower part 12, which are shown as threadedly connected at 13.

The lower part 12 of the casing has therein a fluid inlet passage 14 and a fluid outlet passage 15, and contains at the middle part thereof a valve mechanism chamber 16.

An inlet and outlet closing means for said casing 11—12 is shown in Figs. 1 and 2, and contains a hollow cylindrical member 17, which is internally threaded at the upper end thereof at 18, and serves as a valve carrier.

The valve proper consists of an expansible metallic split ring 19, which is shown in Figs. 1, 2 and 5 and has thereon, at the upper end thereof, an inwardly extending flange 19a, and encloses another expansible ring 20, which is coaxial therewith and in contact with the inner surface thereof.

The split in said ring 19 extends through said flange 19a, and the split in said ring 20 is staggered with relation to the split in said ring 19, thereby producing a tight closing of the valve 19, 20.

The flange 19a of said ring 19 fits under an annular flange 21 on said valve carrier 17, and said ring 19 is retained in contact with the inner cylindrical surface of said lower casing 12 by means of a nut 22, which is shown in Figs. 1 and 2. The lower end of said ring 19 is retained in position and kept from falling down by means of a flange 23 on said nut 22.

A shoulder 24 at the lower end of the valve carrier 17 limits the position of said nut 22 and prevents it from binding said ring 19 endwise thereof, the depth or height of said ring 19 being slightly less than the distance from said flange 21 to said shoulder 24, as shown in Figs. 1 and 2, thereby allowing said ring 19 freedom of motion lengthwise of said valve carrier 17.

Openings 25, which are shown in Figs. 1 and 2, are provided in said nut 22 by said flange 23, by means of which the fluid passing through said casing 11—12 may enter a chamber 26 which is enclosed by flange 19a, said ring 20 and the upper edge of said nut 22.

The interior of said upper casing 11 has secured thereto a liner 27, which is threaded into said casing at 28 and has therein a pair of vertically positioned guideways 29, which are shown in Figs. 1, 2 and 3, and receive therein a pair of guides 30, which are provided on said carrier 17, whereby said carrier 17 is prevented from rotating with relation to said casing 11—12 when said carrier is actuated by a feed screw 32, as hereinafter described.

A closure operating stem 31 terminates at the lower end thereof in said feed screw 32, which is shown in Figs. 1 and 2 as threadedly engaging the opening 18 of said valve carrier 17, thereby actuating said carrier and in co-operation with said guides 30 moving said carrier lengthwise the axis thereof; the upper end of said stem 31 extends through said casing 11 and may be provided with any rotating means such as a hand wheel 33, whereby said stem with said feed screw 32 thereon may be rotated.

The stem 31 has thereon an enlargement 34 to contact with a part of the interior of said casing 11 as at 35, to prevent leakage through the upper end of said casing 11 past said stem 31.

A spring 36 is provided to keep said enlargement 34 in contact with said part 35; said spring 36 encompasses the upper end of said stem 31 and is positioned in a housing or chamber 37 formed at the upper end of said casing 11; one end of said spring 36 abuts against the lower end of said chamber 37 and the other end thereof presses on said hand-wheel 33 thereby drawing said stem 31 with said enlargement 34 thereon upwardly and pressing the latter into contact with said part 35.

In the modification shown in Fig. 5 the nut 22 is omitted and said split rings 19 and 20 are retained in position by a pin 38 passing through the lower end of said valve carrier 17 transversely to the latter, the ends of said pin 38 extending under said rings 19 and 20, thereby retaining the same in position.

To prevent leakage of fluid through the slit 19b in said flange 19a of said ring 19, I provide a slitted sector of an annulus 39, which is secured to said flange 19a by rivets 40 in a recess 41 provided in the top of said flange 19a for receiving said sector 39 therein.

The slit 39b of said sector 39 is staggered with relation to said slit 19b of said flange 19a, thereby preventing leakage therethrough.

It is evident that by the use of the split rings 19 and 20, the former with the split flange 19a thereon, the pressure of the fluid passing through said casing 11—12 is employed to maintain sufficient contact between said rings 19 and 20 and between said ring 19 and the interior of said casing 12, also between said flange 19a with said sector 39 thereon and the underside of said flange 21, to prevent leakage of fluid therethrough. The pressure of said contact is directly proportional to the pressure of said fluid.

The assembly of my device is as follows:

The valve carrier 17 is first assembled by placing the rings 19 and 20 in position thereon and connecting the nut 22 to the end of said carrier 17. The casing 11 is held upside down with stem 31 in position, after which the spring 36 is placed in chamber 37 and compressed between the end of said chamber and wheel 33, which is connected to the outer end of stem 31 by a nut 41 and a thread 42 at the end of stem 31. The feed screw 32 on stem 31 is then connected to the upper end 18 of said valve carrier 17.

The assembled passage closure is then slipped into the casing 12 and the casings 11 and 12 are screwed together at 13.

Many changes may be made in the details of my packingless and seatless valve, without departing from the main scope of my invention, and parts of my invention may be used without other parts.

I do not, therefore, restrict myself to the details of my packingless and seatless valve as shown in the drawings, but I intend to include also all mechanical equivalents and obvious modifications of the same within the scope of my invention.

I claim:

1. In a packingless and seatless valve a casing, having therein a passage for a fluid and a cylindrical opening, a piston slide valve in said opening, to control the flow of said fluid through said casing, said valve having thereon an expansible member, open to the pressure of said fluid, to fit said opening, a rotatably mounted valve stem in said casing, having thereon a part shaped to move said valve lengthwise the axis of said opening, and a means for cooperating with said slide valve to keep said slide valve from being rotated with relation to said opening.

2. In a packingless and seatless valve a casing, having therein a passage for a fluid and a cylindrical opening, a piston slide valve in said opening, to control the flow of said fluid, said slide valve having thereon an expansible member, open to the pressure of said fluid, to fit said opening, a rotatably mounted valve stem in said casing, having thereon a part shaped to move said slide valve lengthwise the axis of said opening, a means for cooperating with said valve part, to keep said valve from being rotated with relation to said opening, and a means for preventing leakage of fluid past said stem through said casing.

3. In a packingless and seatless valve a casing, having therein a passage for a fluid and a cylindrical opening, a piston slide valve in said opening, to control the flow of said fluid, said valve having thereon an expansible member, open to the pressure of said fluid, to fit said opening, a rotatably mounted valve stem in said casing, having thereon a part shaped to move said slide valve lengthwise the axis of said opening, a means for cooperating with said valve part to keep said valve from being rotated with relation to said opening, an enlarged part on said stem, a part on said casing in contact with said enlarged part, and a means for pressing said last mentioned parts to each other, thereby preventing leakage of fluid past said stem through said casing.

4. In a packingless and seatless valve a casing, having therein a passage for a fluid and a cylindrical opening, a piston slide valve in said opening, to control the flow of said fluid, said slide valve having thereon an expansible member, open to the pressure of said fluid, to fit said opening, a rotatably mounted valve stem in said casing, having thereon a part shaped to move said slide valve lengthwise the axis of said opening, a means for cooperating with said valve part to keep said valve from being rotated with relation to said opening, an enlarged part on said stem, a part on said casing, in contact with said enlarged part, and a resilient means for pressing said last mentioned parts to each other, thereby preventing leakage of fluid past said stem through said casing.

5. In a packingless and seatless valve a casing, having therein a passage for a fluid and a cylindrical opening, a piston slide valve in said opening, to control the flow of said fluid, said slide valve having thereon an expansible member, open to the pressure of said fluid, to fit said opening, a rotatably mounted valve stem in said casing, having thereon a part shaped to move said valve lengthwise the axis of said opening, a means for cooperating with said slide valve part, to keep said slide valve from being rotated with relation to said opening, an enlarged part on said stem, a part in said casing in contact with said enlarged part, a housing in said casing, a spring in said housing, reacting at one end thereof against said housing and at the other end thereof against a part connected to said stem, thereby pressing said enlarged part and said casing part to each other and thereby preventing leakage of fluid past said stem through said casing.

6. In a packingless and seatless valve a casing, having thereon a passage for a fluid and a cylindrical opening, a piston slide valve in said opening, to control the flow of said fluid through said casing, said slide valve comprising a reciprocating carrier and an expansible member, open to the pressure of said fluid, to fit said opening, a rotatably mounted valve stem in said casing, having thereon a part shaped to move said carrier lengthwise the axis of said opening, said carrier having thereon a non-cylindrical part, a non-cylindrical part on said casing, slidably to fit said carrier part, thereby preventing said carrier from being rotated by said stem part.

7. In a packingless and seatless valve a casing, having therein a passage for a fluid and a cylindrical opening, a piston slide valve in said opening, said slide valve, having thereon an expansible member to fit said opening, a reciprocating carrier for said slide valve, extending therethrough, said carrier having thereon a laterally extending flange, and an expansible inwardly extending flange on said expansible member, to fit said carrier flange, thereby preventing leakage of fluid therebetween.

8. In a packingless and seatless valve a casing, having therein a passage for a fluid and a cylindrical opening, a piston slide valve, having thereon an expansible member, to fit said opening, a reciprocating carrier for said slide valve extending therethrough, said carrier having thereon a laterally extending flange, an expansible inwardly extending flange on said member, to fit said carrier flange, a split on said expansible flange, a recess in said expansible flange, a sector, having thereon a split, positioned in said recess and secured to said expansible flange, the split in said sector being staggered with relation to the split in said expansible flange, thereby preventing leakage of fluid between the latter and said carrier flange.

9. In a packingless and seatless valve a casing, having therein a passage for a fluid and a cylindrical opening, a piston slide valve in said opening, to control the flow of fluid through said casing, said slide valve comprising a reciprocating valve carrier and an expansible member, carried thereby, to fit the interior periphery of said opening, said member being open to the pressure of said fluid, a stem rotatably mounted on said casing, a means for rotating said stem, connected thereto, a feed screw on said stem in engagement with a part of said carrier, a non-cylindrical part on said carrier and a non-cylindrical part on said casing, to fit said non-cylindrical carrier part, thereby preventing said carrier from being rotated by the action of said feed screw, and thereby causing said carrier to be reciprocated by said feed screw.

10. In a packingless and seatless valve a casing having therein a passage for a fluid and a cylindrical opening, a piston slide valve in said opening, a reciprocating carrier, extending through said slide valve, a lateral flange on said carrier, an expansible member on said slide valve in endwise abutment with said flange at the upper end of said member, said member being open to the pressure of said fluid, to fit the interior periphery of said opening, a nut, in threaded engagement with the end of said carrier, and a laterally extending flange on said nut to support the lower end of said member.

11. In a packingless and seatless valve a casing, having therein a passage for a fluid and a cylindrical opening, a piston slide valve in said opening, a reciprocating carrier, extending through said slide valve, a lateral flange on said carrier, an expansible member on said slide valve in endwise abutment with said flange at the upper end of said member, said member being open to the pressure of said fluid, to fit the interior periphery of said opening, a nut in threaded engagement with the end of said carrier, a laterally extending flange on said nut to support the lower end of said member, and openings in said nut at said flange, to permit the said fluid to pass therethrough to the interior of said member.

12. In a valve, a casing having a valve receiving bore, a carrier, a valve part thereon, having expansive sealing contact with the wall of said bore and being longitudinally movable relative to said carrier, and means on the carrier and the end of the valve part for forming a sealed joint therebetween through the instrumentalitiy of fluid pressure within said valve part.

13. In a valve, a casing having a fluid passage and a bore, a non-rotatable carrier, a valve member movable therewith and having expansive sealing contact with the wall of said bore, means for providing a sealed joint between the end of said valve member and said carrier, and means for moving the valve member to close the fluid passage.

14. In a valve, a casing, a carrier, a valve on said carrier, said valve consisting of a body having expansive sealing contact with the wall of said casing and means whereby an end of said valve may be held in sealed contact with a part of said carrier through the instrumentality of pressure within said casing.

Signed at New York in the county of New York and State of New York this 2nd day of August A. D. 1929.

BASIL V. SZABÓ.